United States Patent Office 2,961,437
Patented Nov. 22, 1960

---

2,961,437

MONOAZO DYESTUFFS AND THEIR METAL COMPLEX COMPOUNDS

Willy Steinemann, Basel, and Walter Wehrli, Riehen, Switzerland, assignors to Sandoz Ltd., Basel, Switzerland No Drawing. Filed July 14, 1958, Ser. No. 748,184

Claims priority, application Switzerland July 31, 1957

6 Claims. (Cl. 260—151)

The present invention relates to monoazo dyestuffs and their metal complex compounds which in the metal-free form correspond to the general formula $$\left[ \begin{pmatrix} v \\ A \end{pmatrix} - N{=}N - B^{z} \right] - (-NH - CO - O - alkylene - y)_n$$

wherein

B—z stands for the radical of a coupling component coupled in the ortho-position to z.

v for a substituent capable of taking part in metal complex formation or for one convertible into such a substituent, z for a phenolic or enolic hydroxy group, or a primary or secondary amino group in ortho-position to the —N=N— group, n for the number 1 or 2, and y for the radical of a sulfonic acid amide, an aminosulfonic acid amide, a carboxylic acid amide, a carbamic acid ester or a urea linked through the amino group with "alkylene,"

and wherein B and the nucleus A may contain further substituents, and to the preparation of such dyestuffs and compounds.

More specifically, the aforesaid metallizable compounds may be characterized by the formula $$\left( \begin{matrix} v & z \\ A{-}N{=}N{-}B \end{matrix} \right) - (-NH - CO - O - alkylene - NH - u - w)_n$$

wherein A, B—z, v z, n and y are as precedingly defined, and u stands for —CO— or —SO$_2$—, and w stands for amino, lower alkylamino, lower hydroxyalkylamino, lower alkoxyalkylamino, di-(lower alkyl)-amino, lower alkyl, mononuclear aryl, lower alkoxy, lower hydroxyalkoxy or lower alkoxyalkoxy, the alkylene being preferably —CH$_2$—    —CH$_2$CH$_2$—    —CH$_2$CH—
                                    |
                                   CH$_3$ —CH$_2$CH$_2$CH$_2$—  or  —CH$_2$CH$_2$CH$_2$CH$_2$—

A series of especially interesting monoazo dyestuffs and their metal complex compounds correspond in the metal-free state to the formula $$\begin{matrix} OH & & OH \\ t - \underset{s}{\bigcirc} - N{=}N - \underset{\underset{NH-CO-O-C_2H_4-NH-SO_2-R}{8\ \ 5}}{\bigcirc} \end{matrix}$$

wherein s represents chlorine, nitro or the sulfonic acid phenylamide group, t represents hydrogen or chlorine, R represents a lower alkyl group, a mononuclear aryl group or a di-(loweralkyl)-amino group, and the group —NH—CO—O—C$_2$H$_4$—NH—SO$_2$—R stands in one of the positions 5 and 8.

The process for the production of the new monoazo dyestuffs and their metal complex compounds consists in coupling 1 mol of the diazo compound of an aminobenzene containing in ortho-position to the amino group a substituent which is intrinsically capable of taking part in metal-complex formation or which can be converted to perform this function with 1 mol of a coupling component coupling in the adjacent position to a phenolic or enolic hydroxy group or to a primary or secondary amino group, the monoazo dyestuff formed, which must contain at least once in the diazo component or the coupling component or in both the grouping —NH—CO—O—alkylene—y wherein y has the above-named meaning, being subsequently treated with a metal-yielding agent either in substance or on the fiber.

Mixtures of monoazo dyestuffs are produced by coupling 1 mol of the diazo compound of an aminobenzene containing in ortho-position to the amino group a substituent which is capable of taking part in metal complex formation or can be converted to fulfill this function with 1 mol or a mixture of two or more coupling components coupling in the adjacent position to a phenolic or enolic hydroxy group or to a primary or secondary amino group; or, alternatively, by coupling 1 mol of a mixture of diazo compounds of two or more aminobenzenes containing in ortho-position to the amino group a substituent capable of metal complex formation or one convertible into such a substituent either with 1 mol of a coupling component coupling in the adjacent position to a phenolic or enolic hydroxy group or to a primary or secondary amino group or with 1 mol of a mixture of two or more coupling components of the same type. At least one half of the dyestuff molecules of the resultant monoazo dyestuff mixture must contain once in the diazo component or in the coupling component or in both the grouping —NH—CO—O—alkylene—y wherein y has the above-named meaning.

The dyestuff mixture is treated with a metal-yielding agent in substance or on the fiber to yield mixed metal complex compounds.

The substituent v which is capable of taking part in metal complex formation or which can be converted into such a form is preferably a hydroxy, methoxy or carboxy group; it can also be a halogen atom (chlorine or bromine), which is converted by hydrolysis into a hydroxy group or by condensation with a sulfonic acid amide into a —NH—SO$_2$— group. Of the substituents which may be contained in the nucleus A as here defined, the following may be enumerated as examples: halogen atoms (chlorine, bromine), nitrogen, acetylamino, propionylamino, benzoylamino, carboxy, carbomethoxyamino, carbethoxyamino, methyl, ethyl tert. butyl, methoxy, sulfonic acid, sulfonic acid amide, sulfonic acid methylamide, sulfonic acid dimethylamide, sulfonic acid-(2'-hydroxy)-ethylamide, sulfonic acid di-(2'-hydroxyethyl)-amide, sulfonic acid-(2'- or 3'-hydroxy)-propylamide, sulfonic acid-(3'-methoxy)-propylamide, sulfonic acid-(2'-ethoxy-ethylamide, sulfonic acid phenylamide, sulfonic acid methylphenyl- or chlorophenylamide, sulfonic acid-(2'-carboxy)-phenylamide, sulfonic acid-N-methyl-N-phenylamide, sulfonic acid-N-(2'-hydroxy)-ethyl-N-phenyl amide, methylsulfonyl groups or a —NH—CO—O—alkylene—y group.

The choice of coupling components includes the following: hydroxybenzenes, hydroxynaphthalenes, aminonaphthalenes, alkylamino-, cycloalkylamino-, aralkylamino-, and arylaminonaphthalenes, 1-aryl-3-methyl-5-pyrazolones, acylacetylaminoalkanes, acylacetylaminobenzenes and acylacetylaminonaphthalenes. These coupling components can contain the same substituents as the diazo components, the preferred substituent being the —NH—CO—O—alkylene—y group.

Diazotization of the aminobenzenes according to the invention is carried out in the normal manner; the —NH—CO—O—alkylene—y group is stable to acids and lyes at room temperature.

The diazo compounds so formed are coupled with a coupling component containing a phenolic or enolic hydroxy group at 0° to 10° C., preferably in a weakly alkaline or strongly alkaline medium and if desired in presence of pyridine. The coupling reaction with a coupling component containing a primary or secondary amino group is performed at 10° to 20° C. in a weakly acid, preferably acetic acid, medium. The monoazo compounds formed are precipitated from the coupling mass, if necessary by the addition of salt, and filtered off.

Instead of using homogeneous diazo and coupling components, a diazo compound can be coupled with a mixture of two or more coupling components or a mixture of two or more diazo components with one, two or more coupling components. The reactants must be so proportioned that at least one half of the dyestuff molecules contain an —NH—CO—O—alkylene—y group. As compared with the homogeneous monoazo dyestuffs, these mixtures of monoazo dyestuffs have the advantage that given the correct choice and proportioning of the individual diazo and coupling components, products are obtained which possess the best possible properties for every field of use.

The monoazo dyestuffs or monoazo dyestuff mixtures are converted into their metal complex compounds preferably with chromium or cobalt compounds; cobalt compounds, however, are suitable only for those monoazo dyestuffs which contain in ortho-position to the azo group a hydroxy group or a substituent which can be converted into such a group. Metallization is carried out preferably in aqueous solution or in an organic medium, for example in formamide or 2-ethoxyethanol, or in the concentrated aqueous solution of an alkali metal salt of a low molecular aliphatic monocarboxylic acid. It is advantageous to allow an amount of metal-yielding agent containing less than two but at least one atom of metal to act upon two molecules of monoazo dyestuff.

Examples of suitable chromium compounds are chromic fluoride, chromic sulfate, chromic formate, chromic acetate, chromic potassium sulfate or chromic ammonium sulfate. The chromates, e.g. sodium and potassium chromate or bichromate are also eminently suitable for the metallization of the monoazo dyestuffs. The operation is carried out preferably in a strongly caustic alkaline medium to which additions of reducing substances may be made.

Cobalt compounds suitable for the present purpose are e.g. cobaltous formate, cobaltous acetate and cobaltous sulfate. When metallization is conducted in the concentrated aqueous solution of an alkali metal salt of a low molecular aliphatic monocarboxylic acid, water-insoluble metal compounds such as cobalt hydroxide and cobalt carbonate can also be employed.

It is specially advantageous to carry out metallization in an aqueous or alkaline medium, the metal compounds being added in presence of compounds which maintain the metals dissolved in complex combination in caustic akaline medium; examples of such compounds are tartaric, citric and lactic acid.

The metal complex compounds so obtained are precipitated from aqueous solution by the addition of salt, the organic metallizing solution being first run into water when the operation is carried out in non-aqueous medium. They are then filtered off, washed if necessary and dried.

The metal-containing azo dyestuffs obtained are metal complex compounds in which essentially one metal atom is combined with two molecules of the monoazo compound. They can be described as 1:2 complexes in which one molecule of the monoazo compound is combined with approximately 0.3 to 0.7 atom of metal.

By simultaneous metallization of two or more monoazo dyestuffs it is possible to arrive at products which, like the monoazo dyestuffs themselves, possesses the best possible properties for every field of application.

The new monoazo dyestuffs and their mixtures dye wool, silk, leather and synthetic polyamide fibers by the one-bath and afterchrome dyeing processes in red, yellow, green, blue, violet, gray, brown and black shades of good fastness to washing, milling, rubbing, potting, acids and alkalis.

The metal-containing azo dyestuffs possess surprisingly high solubility in water and show good affinity for wool, silk, leather and synthetic polyamide fibers from neutral or weakly acid dyebaths, giving red, yellow, green, blue, violet, gray, brown and black shades of good to very good fastness to light, milling, washing, perspiration, carbonizing, decatizing and pressing. A number of them give a good to very good reserve of cotton, polyacrylonitrile, polyester and acetate fibers upon aftertreatment of the dyeings with hydrosulfite. Dyeings on silk can be almost completely stripped from the fiber by treatment with hydrosulfite. Those dyestuffs which are sufficiently soluble in organic solvents are also suitable for dyeing manufactured fibers in the mass prior to spinning and coloring lacquer media and plastics of all types in shades fast to light, washing, perspiration and gas fumes.

In the following examples the parts and percentages are by weight and the temperatures in degrees centigrade.

EXAMPLE 1

17.8 parts of 2-amino-1-hydroxy-4.6-dichlorobenzene in a mixture of 17 parts of 30% hydrochloric acid and 130 parts of water at 5° are diazotized in the normal way with a solution of 6.9 parts of sodium nitrite in 30 parts of water. Afterwards the diazo suspension is carefully neutralized to a pH value of 5.0 for which purpose about 29.5 parts of a 17% sodium carbonate solution are required.

The diazo suspension is gradually mixed with a solution, cooled to at least +5°, of 34 parts of 7-hydroxynaphthyl-1-carbamic acid-2'-(methylsulfonylamino)-ethyl ester, 8.8 parts of sodium hydroxide, 7 parts of calcined sodium carbonate and 250 parts of water. The mass is stirred at 0–5° until the coupling reaction is completed. The new monoazo dyestuff is salted out, filtered with suction, washed and dried. On grinding it is obtained as a readily soluble powder giving blackish solutions in water and bordeaux-red solutions in concentrated sulfuric acid. The afterchromed dyeings on wool are of blue-gray shade and show excellent fastness to light, washing and milling.

The dyeing method is as follows:

2 parts of the above-described monoazo dyestuff and 10 parts of anhydrous sodium sulfate are dissolved in 6000 parts of water at 40°. 100 parts of wool are entered into this dyebath and the temperature increased to 100° in the course of about 30 minutes. 20 parts of 10% acetic acid are added and the bath boiled for 30 minutes; then 20 parts of 10% formic acid are added and the bath boiled for 30 minutes, the evaporated water being gradually replaced; finally 1 part of sodium bichromate in a 10% aqueous solution is added and the bath boiled for a further 30 minutes. The afterchromed wool dyeing is then removed, rinsed with water and dried. It is dyed in a level blue-gray shade of very good fastness to washing, milling, acids, potting and light.

The new coupling component used for the production of the monoazo dyestuff of this example can be obtained, e.g. by heating an intimate mixture of 1 mol of 7-hydroxynaphthyl-1-carbamic acid-2'-chloroethyl ester, 1.1 mols of methanesulfonic acid amide and 1.2 mols of anhydrous sodium acetate.

EXAMPLE 2

26.4 parts of 2-amino-1-hydroxybenzene-4-sulfonic acid phenylamide in 180 parts of water and 20 parts of concentrated hydrochloric acid are diazotized at 8–12° by the addition of a solution of 6.9 parts of sodium nitrite in 14 parts of water. The diazo suspension, neutralized with sodium carbonate, is run into a cooled solution at 0–5° of 37 parts of 7-hydroxynaphthyl-1-carbamic acid-2'-(dimethylaminosulfonylamino)-ethyl ester, 8.8 parts of sodium hydroxide, 10 parts of calcined sodium carbonate and 250 parts of water. On completion of coupling the new monoazo dyestuff is isolated in the normal way.

62.8 parts of this dyestuff are dissolved in 400 parts of formamide. The solution is heated to 100–110° and in about 30 minutes 30 parts of crystallized chromic ammonium sulfate are added, the mixture being maintained at 100–120° until formation of the chromium complex is completed. Hereupon the chroming mass is diluted with 4 to 5 times its volume of water and the chromium complex compound salted out, filtered off, dried and ground. The chromium-containing dyestuff is a blue-black powder readily soluble in water; it dyes wool, silk, leather and polyamide fibers in gray shades of very good fastness to light, perspiration, washing and milling.

2 parts of the chromium-containing azo dyestuff thus obtained are dissolved in 4000 parts of water at 40–50°. 100 parts of pre-wetted wool are introduced into this dyebath and after the dropwise addition of 2 parts of 100% acetic acid the bath is heated to the boil in 30 minutes and maintained at this temperature for a further 45 minutes. The dyed wool is removed, rinsed with water and dried; the dyeing obtained shows very good fastness to light, washing and milling.

EXAMPLE 3

To an ice-cold solution of 14.4 parts of 2-amino-1-hydroxy-4-chlorobenzene, 17 parts of 30% hydrochloric acid and 100 parts of water is added a solution of 6.9 parts of sodium nitrite in 14 parts of water. The mixture is stirred at 0–5° until diazotization is complete, then after neutralization with sodium carbonate the diazo suspension is run into a solution at 0–5° of 42 parts of 7-hydroxynaphthyl-1-carbamic acid-2'-(4''-methylphenyl-1''-sulfonylamino)-ethyl ester, 8.8 parts of sodium hydroxide and 10 parts of anhydrous sodium carbonate in 250 parts of water. When the coupling reaction is completed the dyestuff is isolated in the normal way.

28 parts of the sodium salt of the dyestuff so formed are heated at 80° with 400 parts of water and 30 parts of an 18% cobalt acetate solution (equivalent to 1.77 parts of cobalt). A sufficient amount of 10% sodium hydroxide solution is dropped in to give pH 9.5. When metallization is complete the cobaltiferous dyestuff is isolated and dried; it is a dark-colored powder which dyes wool and polyamide fibers in violet shades of good all-round fastness.

A very similar dyestuff is produced when instead of 42 parts of 7-hydroxynaphthyl-1-carbamic acid-2'-(4''-methylphenyl-1''-sulfonylamino)-ethyl ester, 39 parts of 1-(4'-methylphenyl-1'-sulfonylamino-acetylamino)-7-hydroxynaphthalene are employed. This latter compound is obtained by condensation of 4-methylphenyl-1-sulfonylaminoacetic acid with 1-amino-7-hydroxynaphthalene or by heating at 80–90° for several hours 23.5 parts of 1-chloroacetylamino-7-hydroxynaphthalene, 20 parts of 4-methylbenzene-1-sulfonic acid amide and 6 parts of calcium oxide in 150 parts of water.

EXAMPLE 4

15.4 parts of 2-amino-1-hydroxy-4-nitrobenzene in a mixture of 20 parts of 30% hydrochloric acid and 100 parts of water at 5° are diazotized with a solution of 6.9 parts of sodium nitrite in 14 parts of water. The diazo suspension is carefully neutralized and run into an ice-cold solution of 21 parts of 7-hydroxynaphthyl-1-carbamic acid-2'-(4''-methyl-phenyl-1-''-sulfonlyamino)-ethyl ester, 15.1 parts of 1-(acetyl-aminoacetylamino)-7-hydroxynaphthalene, 6.5 parts of sodium hydroxide and 10 parts of anhydrous sodium carbonate in 300 parts of water. On completion of coupling the resultant dyestuff mixture is isolated in the usual manner and dried. The mixture is then dissolved in 300 parts of formamide, the solution heated to 100° and 30 parts of crystallized chromic potassium sulfate gradually added in the course of 30 minutes. The mass is stirred at 100° until complex formation is complete. The dyestuff is precipitated by running in a dilute solution of common salt and is then filtered off and dried. The dark powder obtained on grinding dyes wool from neutral to weakly acid baths in olive shades which are fast to light, washing and milling. The dyestuff gives a very good reserve of cotton, polyacrylonitrile, polyester and acetate fibers when the material is cleared with hydrosulfite after dyeing. Silk dyeings can be almost completely stripped with hydrosulfite.

EXAMPLE 5

28.9 parts of 3-amino-4-hydroxyphenyl-1-carbamic acid-2'-(methylsulfonylamino)-ethyl ester in 200 parts of water and 25 parts of concentrated hydrochloric acid at 0–5° are diazotized with a solution of 6.9 parts of sodium nitrite in 14 parts of water. The diazonium compound is carefully neutralized with sodium carbonate and poured into an ice-cold solution of 16 parts of 2-hydroxynaphthalene, 8.8 parts of sodium hydroxide, 10 parts of anhydrous sodium carbonate and 250 parts of water. On completion of coupling the dyestuff is islolated in the normal way and dried to give a blue-black powder which, when dyed and afterchromed on wool yields blue shades of good fastness.

EXAMPLE 6

14.4 parts of 2-amino-1-hydroxy-4-chlorobenzene in 100 parts of water and 17 parts of 30% hydrochloric acid are diazotized with a solution of 6.9 parts of sodium nitrile in 14 parts of water at 0–5°. The diazo solution is carefully neutralized with sodium carbonate and poured into an ice-cold solution of 29 parts of 6-hydroxynaphthyl-1-carbamic acid-2'-formylaminoethyl ester (produced by heating at 100–110° the solution of 6-hydroxynaphthyl-1-carbamic acid-2'-chloroethyl ester in formamide) in 250 parts of water, 6 parts of sodium hydroxide and 8 parts of anhydrous sodium carbonate. When coupling is finished the dyestuff is isolated and dried. The pulverized monoazo dyestuff is dissolved in 400 parts of formamide, heated to 100–110° and 30 parts of crystallized chromic potassium sulfate are added to it in the course of 1 hour. The solution is maintained at 100–110° until formation of the complex is completed, it is then diluted with ample water and the chromiferous dyestuff precipitated by an addition of common salt, filtered off, dried and ground. It is obtained as a dark powder which dissolves in concentrated sulfuric acid with a bluish red coloration and dyes wool from neutral or weakly acid baths in fast blue shades.

Very similar dyestuffs are obtained when the 29 parts of 6-hydroxynaphthyl-1-carbamic acid-2'-(formylamino)-ethyl ester used in the foregoing example is replaced by 26 parts of 1-(formylaminoacetylamino)-6-hydroxynaphthalene or by 30 parts of 6-hydroxynaphthyl-1-carbamic acid-2'-(acetylamino)-ethyl ester.

EXAMPLE 7

26.2 parts of the dyestuff from diazotized 2-amino-1-hydroxy-4-chloro-5-nitrobenzene and 7-hydroxynaphthyl-1-carbamic acid-2'-(methylsulfonylamino)-ethyl ester plus 21 parts of the dyestuff from diazotized 2-amino-1-hydroxybenzene-4-sulfonic acid methylamide and 1-acetoacetylamino-2-methoxybenzene are dissolved in 350 parts of formamide. 15 parts of crystallized cobalt acetate are added and the solution stirred at 100° until complete formation of the metal complex. The cobalt-containing dyestuff is isolated in the normal manner. It dyes wool from neutral or weakly acid baths in green shades.

EXAMPLE 8

27.8 parts of the dyestuff from 2-amino-1-hydroxy-4-chlorobenzene and 7-hydroxynaphthyl-1-carbamic acid-2'-(4''-methylphenyl-1''-sulfonylamino)-ethyl ester plus 20.4 parts of the dyestuff from 2-amino-1-hydroxybenzene-4-sulfonic acid amide and 1-(3'-chlorophenyl)-3-methyl-5-pyrazolone are dissolved in 400 parts of formamide. 15 parts of crystallized cobalt acetate are added and the solution stirred at 100° until the complex compound is completely formed. The cobalt-containing dyestuff is isolated in the normal way; it dyes wool from neutral to weakly acid baths in fast brown shades.

EXAMPLE 9

40 parts of the dyestuff produced from diazotized 2-amino-1-hydroxy-4-nitrobenzene and 6-hydroxynaphthyl-1-carbamic acid-2'-(4''-methylphenyl-1''-sulfonylamino)-ethyl ester plus 15.6 parts of the dyestuff obtained from 2-amino-1-hydroxy-4-nitrobenzene and 7-hydroxynaphthyl-1-carbamic acid-(2'-dimethylaminosulfonylamino)-ethyl ester are dissolved in 400 parts of formamide. The solution is heated to 100–110° and over the next hour 28 parts of crystallized chromic potassium sulfate are added, the temperature of 100–110° being maintained throughout until complete formation of the metal complex compound. The reaction mass is then diluted with 2 liters of water and the chromium-containing dyestuff is precipitated with common salt. After subsequent filtering, drying and grinding a dark powder is obtained which gives bordeaux-red solutions in concentrated sulfuric acid and dyes wool, silk and synthetic polyamide fibers in fast black shades.

EXAMPLE 10

24.5 parts of the dyestuff from diazotized 2-amino-1-hydroxy-4-nitrobenzene and 6-hydroxynapthyl-1-carbamic acid-2'-(methylsulfonylamino)-ethyl ester plus 17.3 parts of the dyestuff from diazotized 2-amino-1-hydroxy-4-chloro-5-nitrobenzene and 2-hydroxynaphthalene are converted into a chromium complex as described in Example 9 using 28 parts of crystallized chromic potassium sulfate in formamide at 100–110°. Isolated, dried and ground, the chromium-containing dyestuff is a dark powder which dissolves in concentrated sulfuric acid with a bordeaux-red coloration and dyes wool, silk and synthetic polyamide fibers in fast black shades.

In the following table are listed further monoazo dyestuffs and metal-containing azo dyestuffs which are obtainable according to the particulars of Examples 1, 2, 3, 5 and 6. They are characterized by the diazo and coupling components in columns (I) and (II), the substituent R of the diazo or coupling component or of both components in column (III), the form in which applied (column (IV)) and the shade of the metallized dyeing on wool (column (V)). In column (III) the substituent R stands for the —NH—CO—$x$-alkylene-$y$ group wherein $x$, alkylene and $y$ have the meanings assigned to them in the appropriate columns. The abbreviations in column (IV) signify: Afterchr.=Afterchrome dyestuff, Cr-C=Chromium complex compound, Co-C=Cobalt complex compound.

*Table 1*

| Ex. No. | (I) Diazo Component | (II) Coupling Component | (III) R= —NH—CO—$x$-alkylene-$y$ | | | (IV) Form in which applied | (V) Shade of metallized dyeing on wool |
|---|---|---|---|---|---|---|---|
| | | | $x$ | alkylene | $y$ | | |
| 11 | 2-amino-1-hydroxy-4-R-benzene. | 2-hydroxynapththalene-6-sulfonic acid. | 0 | ethylene | phenylsulfonylamino | afterchr. | blue. |
| 12 | do | 1-phenyl-3-methyl-5-pyrazolone. | 0 | do | propionylamino | Co—C | red-orange. |
| 13 | 2-amino-1-hydroxy-6-chloro-4-R-benzene. | 1-hydroxy-5-chloronaphthalene. | 0 | do | acetylamino | Cr—C | blue. |
| 14 | 2-amino-1-hydroxy-4-methyl-6-R-benzene. | 1-acetoacetylamino-2-ethylhexane. | 0 | do | ethylureylene | Co—C | reddish yellow. |
| 15 | 2-amino-1-hydroxy-4-chloro-6-R-benzene. | 1-acetylamino-7-hydroxynaphthalene. | 0 | do | butyrylamino | Cr—C | blue. |
| 16 | do | 1-(3'-chloro)-phenyl-3-methyl-5-pyrazolone. | 0 | do | acetylamino | Cr—C | red. |
| 17 | do | 2-hydroxynaphthalene-3,6-disulfonic acid. | 0 | do | do | afterchr. | blue. |
| 18 | 2-amino-1-hydroxy-4-R-benzene. | 1-acetoacetylamino-benzene-4-sulfonic acid morpholide. | 0 | do | do | Co—C | reddish yellow. |
| 19 | 2-amino-5-R-benzene-1-carboxylic acid. | 2-hydroxynaphthalene. | 0 | do | carbomethoxyamino | Cr—C | red-brown. |
| 20 | 2-amino-1-hydroxy-4-R-benzene. | 1-phenyl-3-methyl-5-pyrazolone-3'-sulfonic acid-(2''-hydroxy)-ethylamide. | 0 | do | 4-methylphenyl sulfonylamino. | Cr—C | red. |
| 21 | 2-amino-5-R-benzene-1-carboxylic acid. | 1-acetoacetylamino-2-methoxybenzene. | 0 | do | formylamino | Cr—C | yellow. |
| 22 | 2-amino-1-hydroxy-4-nitrobenzene. | 1-R-6-hydroxynaphthalene. | 0 | do | n-butylsulfonylamino. | Cr—C | black. |
| 23 | 2-amino-1-hydroxybenzene-4-sulfonic acid. | do | 0 | do | acetylamino | afterchr. | gray. |
| 24 | 2-amino-1-hydroxybenzene-4-sulfonic acid methylamide. | 1-(4'-R)-phenyl-3-methyl-5-pyrazolone. | 0 | do | do | Cr—C | red. |
| 25 | do | 2-(4'-R)-phenyl-amino-naphthalene. | 0 | do | do | Cr—C | gray-violet. |
| 26 | 2-amino-1-hydroxy-4,6-dichlorobenzene. | 1-R-7-hydroxynaphthalene-3-sulfonic acid. | 0 | do | do | afterchr. | gray. |
| 27 | 2-amino-1-hydroxy-4-nitrobenzene. | 1-hydroxy-2-R-4-methylbenzene. | 0 | do | methylsulfonylamino. | Cr—C | brown. |
| 28 | do | 1-R-6-hydroxynaphthalene. | 0 | do | do | Cr—C | black. |
| 29 | 2-aminobenzene-1-carboxylic acid. | 1-acetoacetylamino-3-R-benzene. | 0 | do | do | Cr—C | yellow. |
| 30 | 2-amino-1-hydroxy-4-nitrobenzene. | 1-hydroxy-2-R-4-methylbenzene. | 0 | do | do | Co—C | brown. |
| 31 | 2-amino-1-hydroxy-4-nitro-6-chlorobenzene. | 1-R-6-hydroxynaphthalene. | 0 | do | diethylaminosulfonylamino. | Cr—C | gray-black. |
| 32 | 2-aminobenzene-1-carboxylic acid. | 1-(3'-R)-phenyl-3-methyl-5-pyrazolone. | 0 | methylene | 4-methylphenylsulfonylamino. | Cr—C | yellow. |

Table 1—Continued

| Ex. No. | (I) Diazo Component | (II) Coupling Component | (III) R= —NH—CO—x-alkylene-y | | | (IV) Form in which applied | (V) Shade of metallized dyeing on wool |
|---|---|---|---|---|---|---|---|
| | | | x | alkylene | y | | |
| 33 | 2-amino-1-hydroxy-4-R-benzene. | 1-(3'-R)-phenyl-3-methyl-5-pyrazolone. | O | ethylene | acetylamino | Cr—C | red. |
| 34 | ___do___ | ___do___ | O | ___do___ | ___do___ | Co—C | red-orange. |
| 35 | ___do___ | 2-methylaminonaphthalene. | O | ___do___ | ___do___ | Co—C | gray. |
| 36 | ___do___ | 2-phenylaminonaphthalene. | O | ___do___ | dimethylaminosulfonylamino. | Cr—C | Do. |
| 37 | 2-amino-1-hydroxybenzene-4-sulfonic acid-(2'-ethoxy)-ethylamide. | 1-R-7-hydroxynaphthalene | O | ___do___ | acetylamino | Cr—C | blue. |
| 38 | 2-amino-1-hydroxy-4-chloro-6-R-benzene. | 2-aminonaphthalene | O | ___do___ | ureylene | Cr—C | gray. |
| 39 | ___do___ | 2-(4'-methyl)-phenyl-aminonaphthalene. | O | ___do___ | aminosulfonylamino | Cr—C | Do. |
| 40 | ___do___ | 2-hydroxynaphthalene | O | trimethylene | acetylamino | Cr—C | blue. |
| 41 | 2-amino-1-hydroxy-4-nitrobenzene. | 1-R-6-hydroxynaphthalene | O | ethylene | methylureylene | Cr—C | gray. |
| 42 | ___do___ | ___do___ | O | ___do___ | 2'-hydroxyethyl-ureylene. | Cr—C | Do. |
| 43 | ___do___ | ___do___ | O | tetramethylene | carbo-(2'-hydroxy)-ethoxyamino. | Cr—C | Do. |
| 44 | 2-amino-1-hydroxybenzene-4-sulfonic acid amide. | ___do___ | O | ___do___ | (4'-methyl)-phenyl-ureylene. | Cr—C | Do. |
| 45 | ___do___ | 1-R-7-hydroxynaphthalene | O | 2-methyl-ethylene. | 3'-methyoxypropyl-ureylene. | Cr—C | Do. |
| 46 | ___do___ | ___do___ | O | ___do___ | methylsulfonylamino. | Cr—C | Do. |
| 47 | 2-amino-1-hydroxybenzene-4-sulfonic acid cyclohexylamide. | ___do___ | O | ethylene | carbo-(2'-ethoxy)-ethoxyamino. | Cr—C | Do. |
| 48 | 2-amino-1-hydroxybenzene-4-sulfonic acid-(4'-methyl)-phenylamide. | ___do___ | O | ___do___ | ethylsulfonylamino | Cr—C | Do. |
| 49 | 2-amino-1-hydroxy-4.6-dichlorobenzene. | ___do___ | O | ___do___ | methylsulfonylamino. | Cr—C | blue-gray. |
| 50 | 2-amino-1-hydroxy-4-chlorobenzene. | ___do___ | O | ___do___ | 4-methylphenylsulfonylamino. | Cr—C | Do. |

Table 2 contains monoazo dyestuff mixtures and their metal complex compounds which are obtainable according to the details given in Examples 4, 7, 8, 9 and 10. They are characterized in the table by the diazo and coupling components and their molecular ratio in columns (I) and (II), the substituents $R_1$ or $R_2$ in column (III), the form in which they are applied (column (IV)) and the shade of the metallized dyeing on wool (column (V)).

EXAMPLE 2

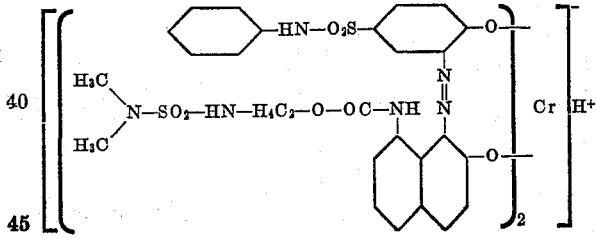

Table 2

| Ex. No. | (I) Diazo Component | | (II) Coupling Component | | (III) $R_1$ or $R_2K$ = x-alkylene-y | | | (IV) Form in which applied | (V) Shade of metallized dyeing on wool |
|---|---|---|---|---|---|---|---|---|---|
| | Mols | | Mols | | x | alkylene | y | | |
| 51 | 2 | 2-amino-1-hydroxy-4.6-dinitrobenzene. | 1 | 1-$R_1$-7-hydroxynaphthalene | O | ethylene | acetylamino | Cr—C | green-gray. |
| | | | 1 | 1-$R_2$-6-hydroxynaphthalene | | methylene | carbethoxyamino | | |
| 52 | 0.6 | 2-amino-1-hydroxy-4-nitro-6-$R_1$-benzene. | 0.6 | 2-aminonaphthalene | | ___do___ | phenylsulfonylamino | Cr—C | gray. |
| | 1.4 | 2-amino-1-hydroxy-4-nitrobenzene. | 1.4 | 1-$R_2$-6-hydroxynaphthalene | O | ethylene | acetylamino | | |
| 53 | 1 | 2-amino-5-$R_1$-benzene-4-carboxylic acid. | 1 | 2-hydroxynaphthalene | | methylene | ___do___ | Cr—C | brown. |
| | 1 | 2-amino-1-hydroxybenzene-4-sulfonic acid cyclohexylamide. | 1 | 1-acetoacetylamino-4-$R_2$-benzene. | O | ethylene | ___do___ | | |

Formulae of representative dyestuffs of the foregoing examples are as follows:

EXAMPLE 1

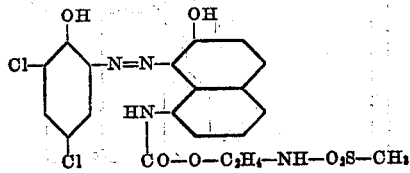

EXAMPLE 3

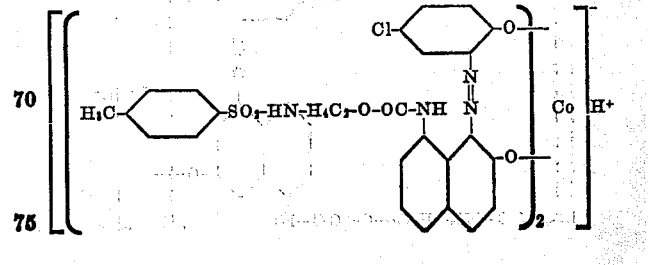

EXAMPLE 4
A mixture of the dyestuffs:
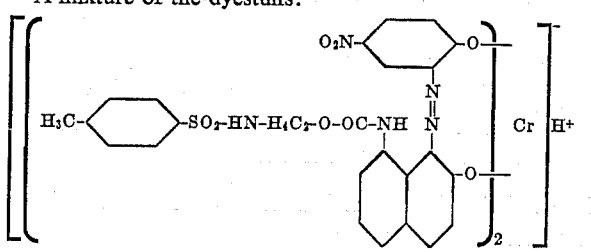
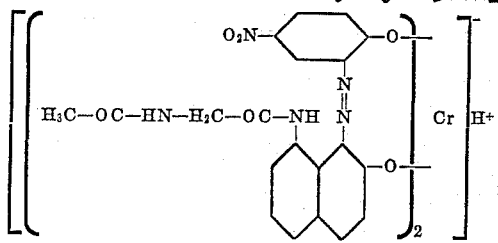
and
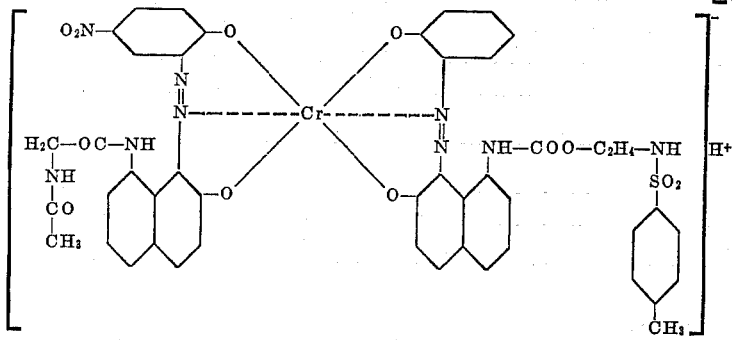
EXAMPLE 5
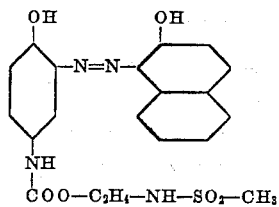
EXAMPLE 6
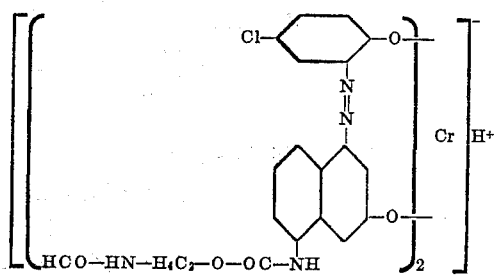
EXAMPLE 7
A mixture of the dyestuffs:
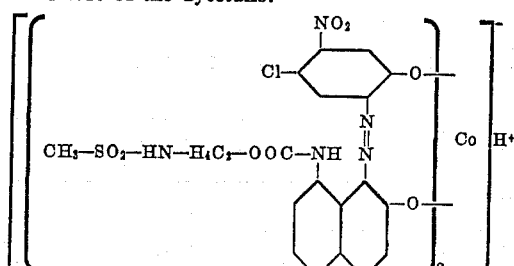
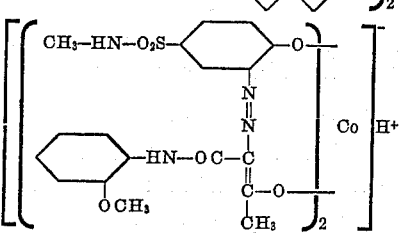
and
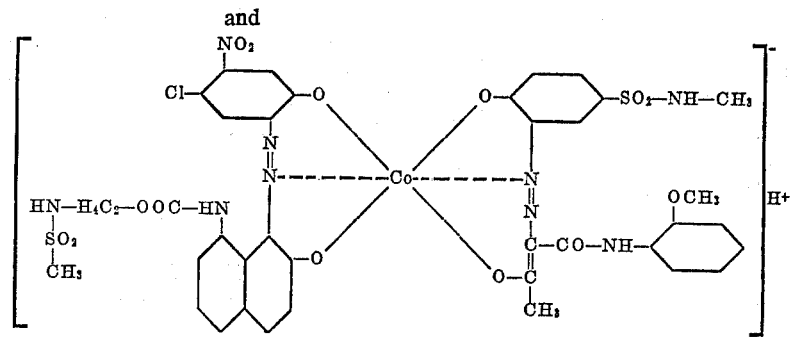
EXAMPLE 8
A mixture of the dyestuffs:
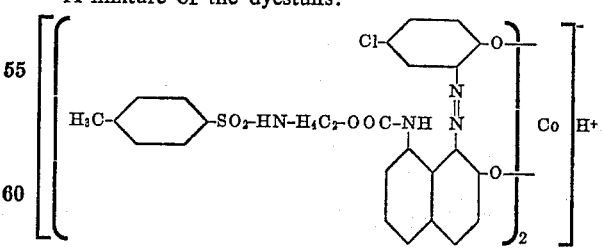
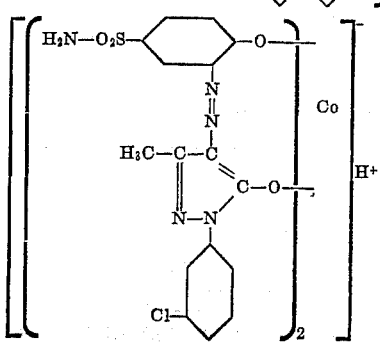

and
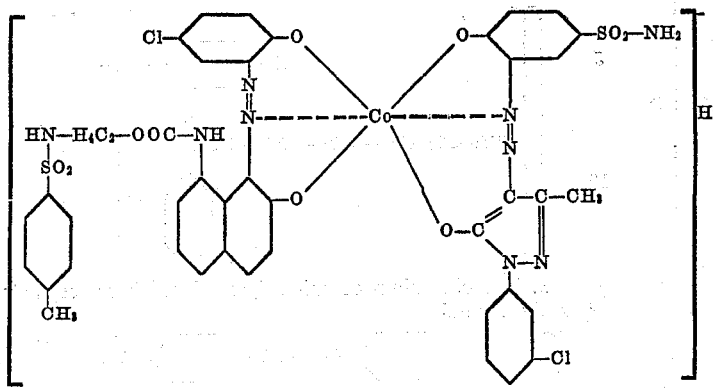
EXAMPLE 9
A mixture of the dyestuffs:
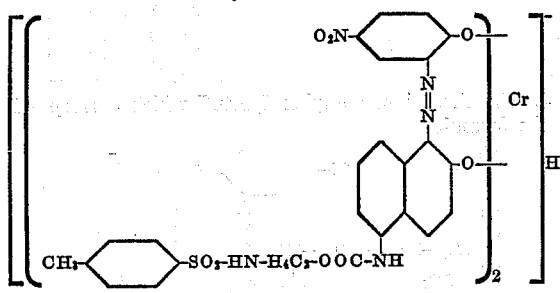
and
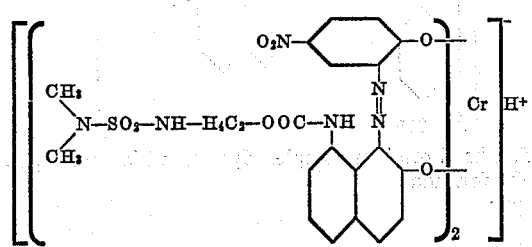
and
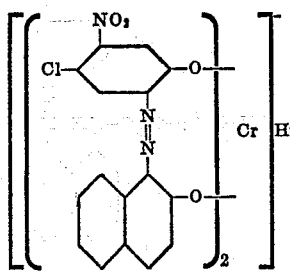
EXAMPLE 10
A mixture of the dyestuffs:
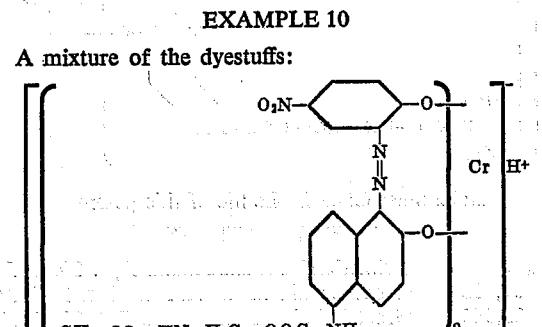
EXAMPLE 22
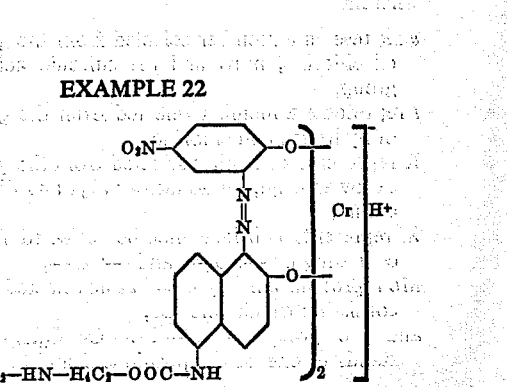

EXAMPLE 31

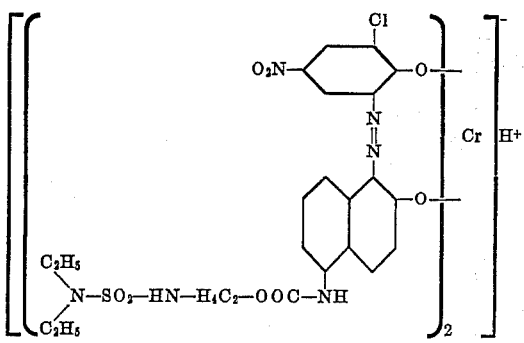

EXAMPLE 49

EXAMPLE 50

Having thus disclosed the invention what we claim is:

1. A chromium complex dyestuff which corresponds to the formula wherein s represents a member selected from the group consisting of chlorine, nitro and the sulfonic acid phenylamide group, t represents a member selected from the group consisting of hydrogen and chlorine, R represents a member selected from the group consisting of lower alkyl, mononuclear aryl and di-(lower alkyl)-amino, X represents a bridge member selected from the group consisting of —SO$_2$— and —CO—, Me represents a heavy metal atom selected from the group consisting of Cr and Co, and the group —NH—CO—O—C$_2$H$_4$—NH—SO$_2$—R stands in one of the positions 5 and 8.

2. The chromium complex dyestuff which corresponds to the formula

3. The chromium complex dyestuff which corresponds to the formula

4. The chromium complex dyestuff which corresponds to the formula

5. The chromium complex dyestuff which corresponds to the formula

6. The chromium complex dyestuff which corresponds to the formula

References Cited in the file of this patent

FOREIGN PATENTS

| | | |
|---|---|---|
| 312,963 | Switzerland | Apr. 30, 1956 |
| 407,055 | Great Britain | Mar. 9, 1934 |
| 785,345 | Great Britain | Oct. 23, 1957 |